United States Patent [19]

Swann

[11] Patent Number: 5,442,844
[45] Date of Patent: Aug. 22, 1995

[54] APPARATUS FOR PROTECTING INTERNAL ELEMENTS OF A WORKHOLDING APPARATUS

[75] Inventor: George R. Swann, Gibsonia, Pa.

[73] Assignee: Chick Machine Tool, Inc., Warrendale, Pa.

[21] Appl. No.: 192,193

[22] Filed: Feb. 4, 1994

Related U.S. Application Data

[60] Continuation of Ser. No. 998,805, Dec. 30, 1992, abandoned, which is a division of Ser. No. 955,361, Oct. 1, 1992, abandoned.

[51] Int. Cl.⁶ ............................................. B25B 1/10
[52] U.S. Cl. ................................. 29/281.1; 269/43; 269/242; 269/247; 269/285
[58] Field of Search ............... 29/281.1, 281.3, 559, 29/281.6; 269/43, 136, 154, 906, 246, 247, 88, 242, 285

[56] References Cited

U.S. PATENT DOCUMENTS

| 1,385,088 | 7/1921 | Mellor . | |
|---|---|---|---|
| 1,811,299 | 6/1931 | Brockhaus, Jr. . | |
| 2,711,904 | 5/1953 | Gartner et al. | 279/157 X |
| 2,770,990 | 11/1956 | Rix | 81/38 |
| 4,098,500 | 7/1978 | Lenz | 269/136 |
| 4,165,869 | 8/1979 | Williams | 269/154 X |
| 4,252,304 | 2/1981 | Pettican | 269/154 X |
| 4,529,183 | 7/1985 | Krason et al. | 269/43 |
| 4,569,509 | 2/1986 | Good | 269/136 X |
| 4,664,394 | 5/1987 | Theissig et al. | 279/157 X |
| 4,898,371 | 2/1990 | Mills et al. | 269/136 |
| 4,928,937 | 5/1990 | Bernstein | 269/136 |
| 4,934,674 | 6/1990 | Bernstein | 269/154 X |
| 5,022,636 | 6/1991 | Swann | 269/154 X |
| 5,098,073 | 3/1992 | Lenz | 269/43 |
| 5,242,159 | 9/1993 | Bernstein | 269/32 |
| 5,351,943 | 10/1994 | Milz | 269/246 |

FOREIGN PATENT DOCUMENTS

0526432A1 7/1992 European Pat. Off. .

Primary Examiner—Timothy V. Eley
Assistant Examiner—Khan V. Nguyen
Attorney, Agent, or Firm—Kirkpatrick & Lockhart

[57] ABSTRACT

A plate member adapted to be received on the base of a machine vise having a longitudinal slot or cavity therein is provided to prevent the entry of foreign material into the slot or cavity. The plate member may also be provided with slots therein to limit the longitudinal travel of the vise's clamping members.

7 Claims, 8 Drawing Sheets

APPARATUS FOR PROTECTING INTERNAL ELEMENTS OF A WORKHOLDING APPARATUS

This is a continuation of copending application Ser. No. 07/998,805 filed on Dec. 30, 1992, abandoned, which is a divisional of copending application Ser. No. 07/955,361 filed on Oct. 1, 1992, is now abandoned.

BACKGROUND OF THE INVENTION

1. Field of the Invention

The present invention relates to workholding apparatuses and, more particularly, is directed to a method and apparatus for positioning a stationary clamping element on a precision machine vise within a predetermined range of accuracy.

2. Description of the Invention Background

Figure 1:
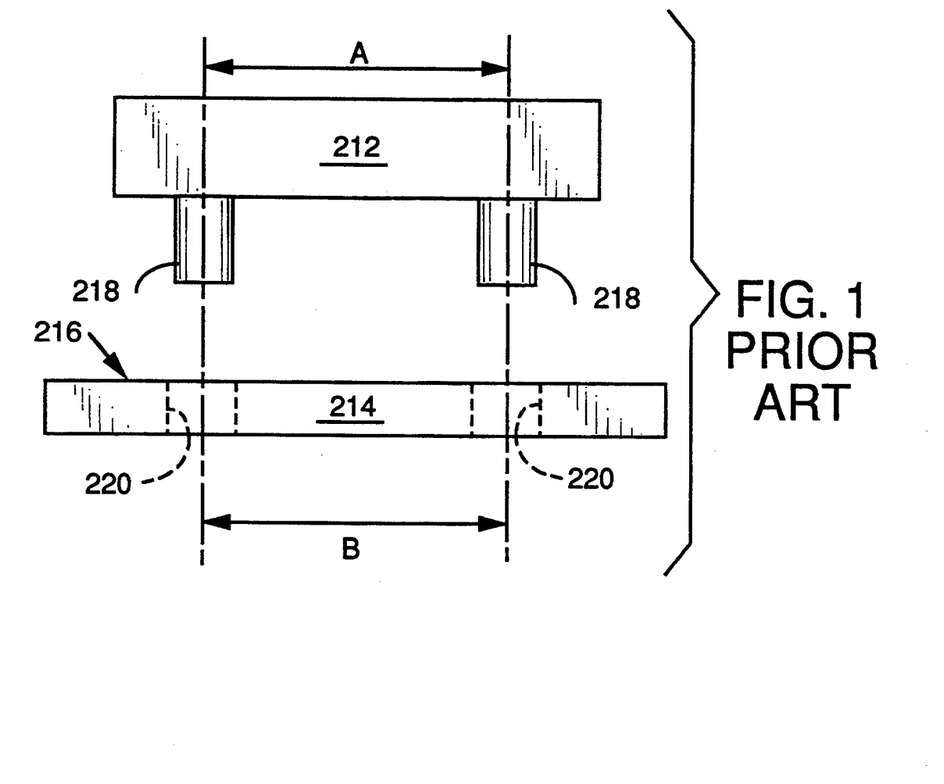
FIG. 1 is an exploded assembly view of a prior method for positioning a member on the planar surface of an object.
Figure 2:
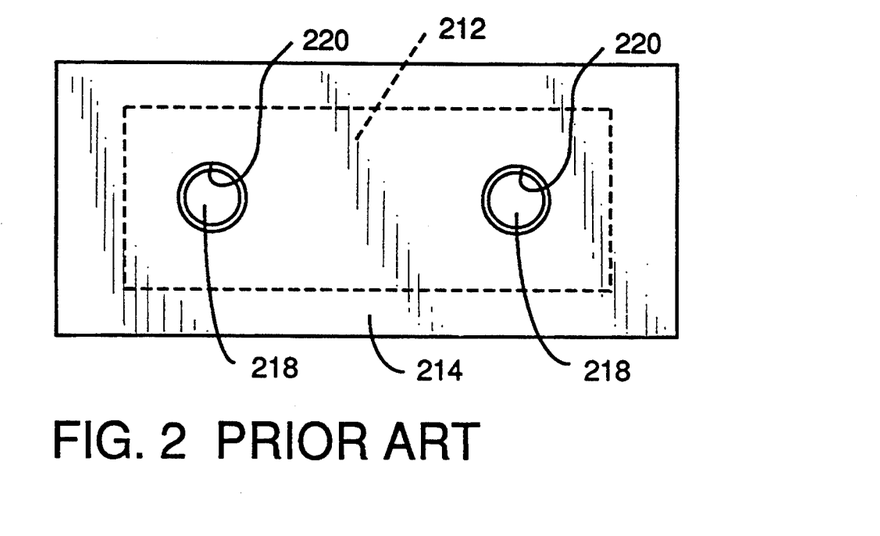
FIG. 2 is a bottom view of the assembly of FIG. 1.

There are a number of known methods for accurately positioning a member on a planar surface of an object. For example, FIGS. 1 and 2 illustrate a known method for positioning a member 212 on an object 214 having a planar surface 216. As shown in FIGS. 1 and 2, two spaced-apart, round pins 218 are attached to the member 212 such that they extend therefrom to be received in corresponding round holes 220 provided in the object 214. To ensure that the pins 218 can be inserted into the holes 220, the distance "A" between the centers of the pins 218 and the distance "B" between the centers of the holes 220 must be precisely controlled so that those distances are substantially equal. Such precision machining is costly and time consuming. As such, to accommodate slight variations between those distances, which can result in misalignments between the pins 218 and the holes 220, the holes 220 are typically fabricated with larger diameters than the outside diameters of the pins 218. However, that action can lead to positioning inaccuracies depending upon the magnitude of the clearance provided between the pins 218 and their corresponding holes 220.

Figure 3:
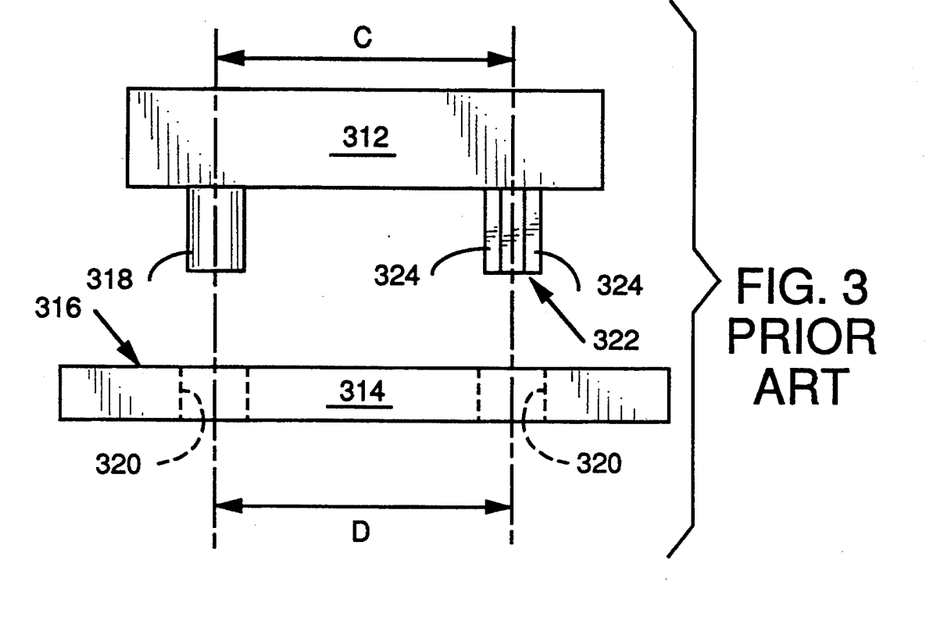
FIG. 3 is an exploded view of another prior method for positioning a member on a planar surface of an object.
Figure 4:
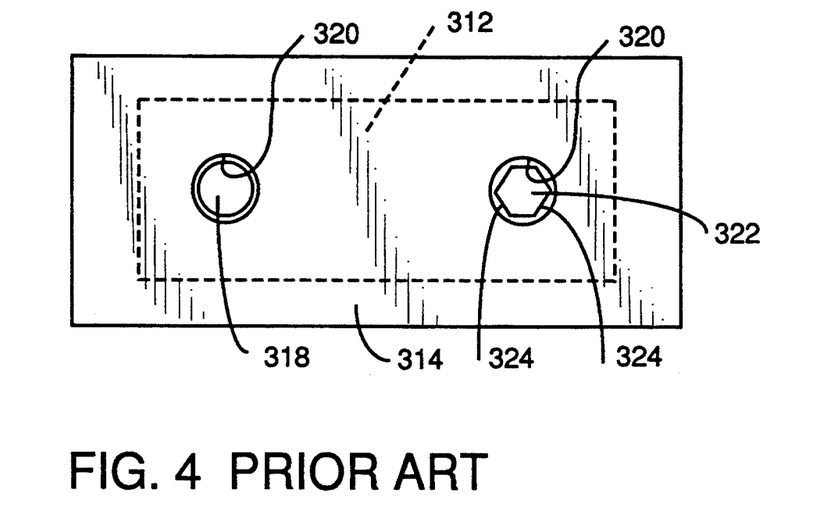
FIG. 4 is a bottom view of the assembly of FIG. 3.

Another known positioning method for positioning an object 312 on a member 314 having a planar surface 316 is illustrated in FIGS. 3 and 4. When using that method, two round holes 320 are provided in the object 314. A round pin 318 and a diamond shaped pin 322 are attached to the pin 312 such that they extend therefrom. The diamond shaped pin 322 typically consists of a round pin with tapered sides 324 machined thereon such that when viewed from one end, the pin appears to be diamond shaped. Slight variations between the distance "C" between the centers of pin 318 and diamond shaped pin 322 and the distance "D" between the centers of the round holes 320 is largely accommodated by the tapered sides 324 of the diamond shaped pin 322. As such, less clearance is needed between the pin 318 and its corresponding hole 320 when compared to the first prior method discussed above. To ensure accurate positioning of the member 312 on the planar surface 316, however, the diamond pin 322 must be rigidly and non-rotatably attached to the member 312. As such, the diamond pin 322 cannot be threadably attached to the pin 312 and, accordingly, other more time consuming fastening methods must be used to fasten the diamond shaped pin 322 to the member 312.

The above-mentioned fastening methods are typically used to obtain acceptable positioning accuracy when affixing stationary clamping elements onto the base member of a precision workholding device. Precision workholding devices are typically used in connection with various machine tools and serve to hold stock pieces of material or workpieces in a precise location during the machining operation.

There are a variety of known apparatuses for holding a workpiece during machining operations. Such apparatuses may comprise apparatuses ranging from simple "C"-clamp operated devices to precision machine vises that have clamping members adapted to be very precisely located with respect to a fixed reference location.

Many workholding apparatuses, such as the one disclosed in U.S. Pat. No. 5,022,636, are adapted to clamp a workpiece between opposing jaw members on a base. Typically, one jaw member is fixed and the other jaw member is movable relative thereto via a screw member. As the movable jaw member is moved towards the fixed jaw member, the workpiece is clamped therebetween. With those devices, however, the members used to position the movable clamping elements of precision workholding apparatuses are typically exposed to chips and debris created by the machining process. Therefore, in order to insure that the chips and debris will not impair the operation of the workholding apparatus, the apparatus must be carefully cleaned after each machining operation or protective covers must be installed. One type of protective cover normally used to prevent chips and debris from hampering the positioning member's operation is a flexible bellows-like cover that is typically attached to the movable clamping element and the fixed clamping element and is arranged to extend therebetween. Those covers, however, because they must extend and collapse in response to the position of the movable clamping element, may sometimes become jammed in the positioning mechanism. In addition, the debris and chips from the machining operation can also collect in the folds of the bellows making the eventual cleanup operation more difficult and time consuming. Further, bellows-like covers afford little protection to the inner-workings and the base of the workholding apparatus should it be accidently dropped.

In addition, because the clamping elements are susceptible to being accidentally advanced out of the base member, screw stops are typically employed to restrict the travel of the clamping elements. Those screw stops, however, must be removed each time the workholding device is cleaned and, thus, increase the amount of time required to clean the workholding apparatus.

In view of the foregoing, there is a need for a method and apparatus that afford acceptable positioning accuracies when positioning a member on a plane surface. There is another need for an apparatus that can be used in connection with precision workholding devices that can limit the longitudinal travel of the clamping elements without hindering the cleaning process. There is a further need for an apparatus that can protect the inner workings and the base member of a workholding apparatus from the chips and debris created during the machining process without hampering the operation of the apparatus.

SUMMARY OF THE INVENTION

In accordance with the preferred form of the present invention, there is provided an apparatus and method for accurately positioning a member on the planar surface of an object using conventional machining techniques. The apparatus may include first and second pin members that are attached to the member such that they extend therefrom. A bore, having a predetermined diameter sized to receive the first pin therein, is provided in the object having the planar surface. A slot is also provided in the object having a planar surface and is sized to receive therein the second pin when the first pin is received in the bore. In another embodiment, the bore and the slot member each may be provided in corresponding removable bushing members that are attached to the object having a planar surface.

The present invention is well adapted for positioning and affixing a stationary clamping member onto the base of a precision machine vise. In addition to the positioning method and apparatus, a plate member, adapted to be received on the base of a machine vise, is provided to protect the inner workings of the vise and to prevent the entry of debris and foreign matter into the positioning cavity or slots provided therein. The plate member may also be provided with a slot or slots arranged to receive a portion of the vise's movable clamping members therein such that the longitudinal movement thereof may be limited to a predetermined range of longitudinal motion.

As such, it is an object of the present invention to provide a means for positioning and, if desired, attaching a member onto the planar surface of an object within a predetermined range of accuracy. It is a further object of the present invention to achieve the desired predetermined range of accuracy by using conventional machining techniques.

Yet another object of the present invention is to provide a means for preventing the entry of foreign matter and debris from entering the longitudinal slots and cavities commonly provided in precision machine vises. It is a further object of the present invention to provided a degree of protection to the base member an inner workings of the machine vise should it be accidently dropped. Further, it is an object of the present invention to provide a means for limiting the longitudinal movement of the movable clamping members of a precision machine vise to eliminate the need for auxiliary screw stops and to facilitate cleaning of the vise by allowing for easy disassembly.

Accordingly, the present invention provides solutions to the aforementioned problems discussed above. However, these and other details, objects and advantages will become apparent as the following detailed description of the present preferred embodiment thereof proceeds.

BRIEF DESCRIPTION OF THE DRAWINGS

In the accompanying drawings, I have shown present preferred embodiments of the invention wherein like reference numerals are employed to designate like parts and wherein.

DETAILED DESCRIPTION OF THE PREFERRED EMBODIMENTS

Figure 5:
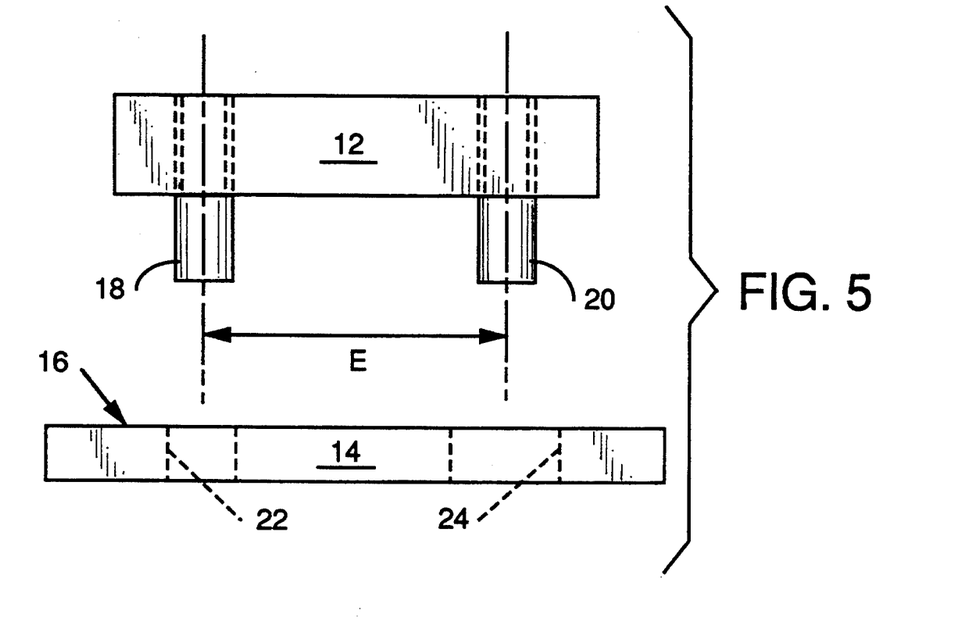
FIG. 5 is an exploded assembly view of the positioning method and apparatus of the present invention.
Figure 6:
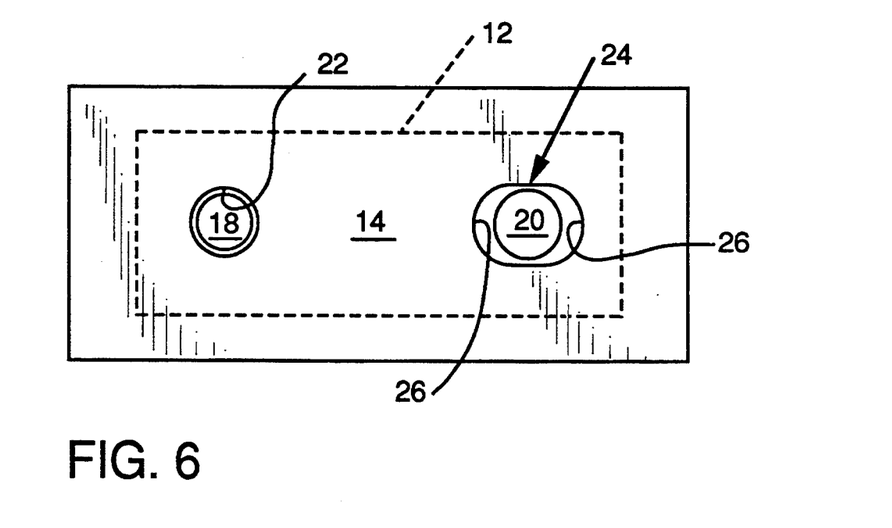
FIG. 6 is a bottom view of the assembly of FIG. 5.

Referring now to the drawings for the purposes of illustrating the present preferred embodiments of the invention only and not for purposes of limiting the same, FIGS. 5 and 6 illustrate the present invention for precisely positioning a member on a planar surface of an object. More particularly, there is shown a member 12 that is adapted to be precisely positioned on an object 14 having a planar upper surface 16. It will be appreciated that member 12 may consist of any solid article such as, for example, a stationary clamping member that is adapted to be precisely positioned on a planar surface like a portion of a machine tool or workholding member.

As illustrated in FIGS. 5 and 6, pins 18 and 20 are attached to member 12 such that they extend from the bottom thereof. Pins 18 and 20 are preferably round and are preferably threadably attached to the member 12. However, pins 18 and 20 may be attached to member 12 by any suitable fastening means. A circular receiving bore 22 is provided through object 14 and is adapted to slidably receive pin 18 therein. It will be appreciated that the inner diameter of bore 22 should be slightly larger (i.e., 0.0003") than the outer diameter of the pin 18 to ensure that pin 18 may be slidably received therein. Also provided in object 14 is a receiving slot 24 adapted to receive pin 20 therein. Slot 24 preferably comprises a round bore that has relieved sides 26 machined therein. It will be appreciated that the range of positioning accuracy of the present invention will be defined by the first amount of clearance provided between pin 18 and bore 22 and the second amount of clearance provided between pin 20 and slot 24. However, I have found that the above-defined range of positioning accuracy can be achieved with relatively large variations in the distance "E" between the center lines of pins 18 and 20 when compared to prior positioning methods. As such, conventional machining techniques may be used without sacrificing the positioning accuracy required with prior positioning methods such as the diamond pin method discussed hereinabove in the Description of the Invention Background. In addition, the present positioning method provides the distinct advantage of enabling the pins 18 and 20 to rotate. Thus, pins 18 and 20 may consist of threaded fasteners for attaching the member 12 to the object 14.

Figure 7:
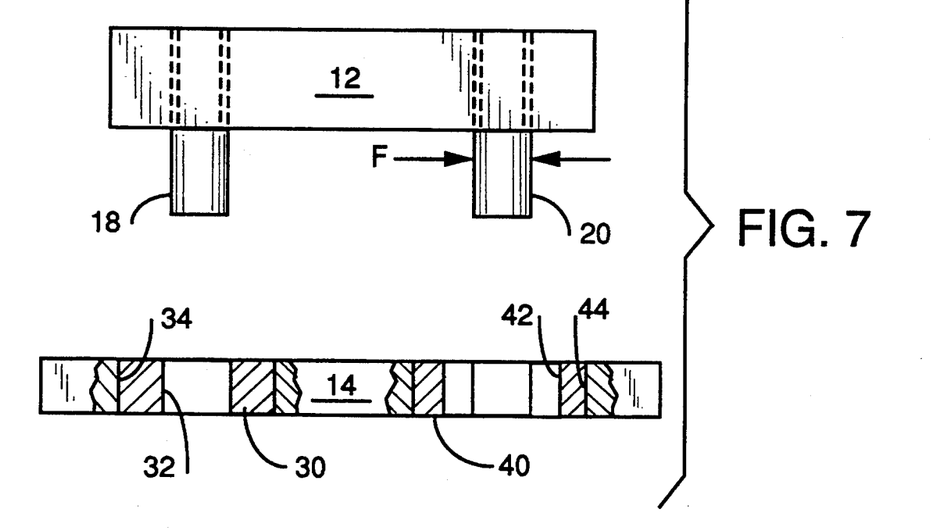
FIG. 7 is an exploded assembly view of another embodiment of the positioning method and apparatus of the present invention.
Figure 8:
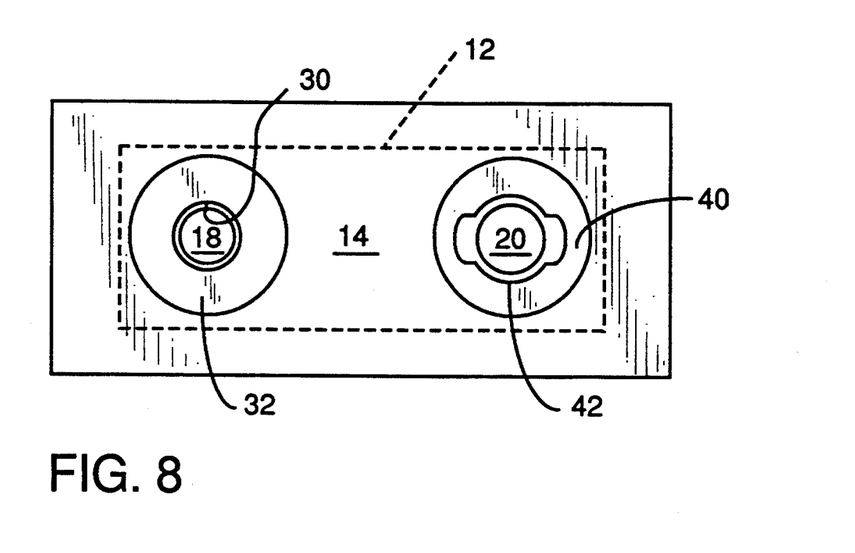
FIG. 8 is a bottom view of the assembly of FIG. 7.

FIGS. 7 and 8 illustrate another preferred embodiment of the present invention for positioning a member 12 on an object 14 having a planar surface 16 within a predetermined range of positioning accuracy. As was discussed above, object 14 may consist of, for example, a workholding device and member 12 may consist of a stationary clamping member adapted to be fastened thereto. In this embodiment, a receiving bore 32 and a slot 42 are preferably machined into bushing members 30 and 40 respectively. Bushing members 30 and 40 are received in bores 34 and 44 in the object 14 and are preferably fabricated from hardened steel. Bushing members 30 and 40 may be fastened to the object 14 by any suitable fastening means such as, for example, by an interference fit established between the outer diameter of the bushings 30 and 40 and bores 34 and 44 provided in object 14.

Figure 9:
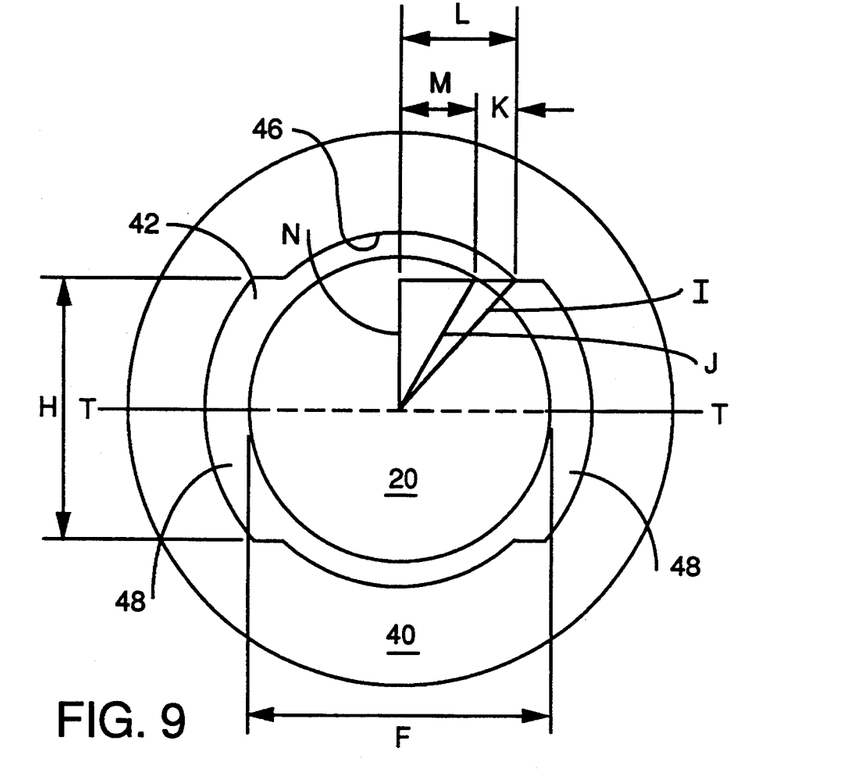
FIG. 9 is a diagrammatic plan view of a bushing and pin assembly of the present invention.
Figure 10:
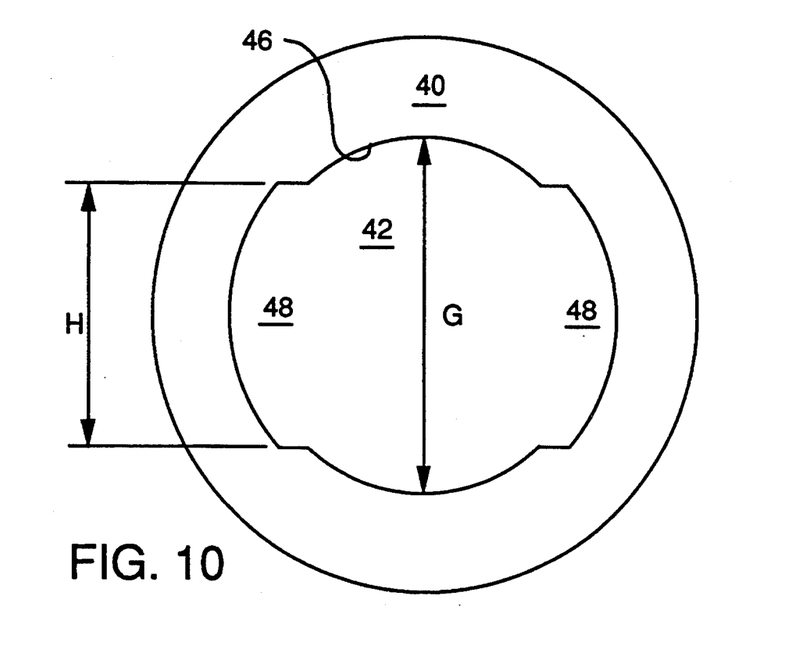
FIG. 10 is a plan view of the bushing of FIG. 9.

It will be understood that receiving bore 32 has an inner diameter that is slightly larger (i.e., 0.0003") than the outer diameter of pin 18 so that pin 18 may be slidably received therein. In the preferred embodiment, as illustrated in FIG. 7, pin 20 is round and has a diameter generally designated as "F". As shown in FIGS. 9 and 10, slot 42 preferably consists of a bore 46 that has a diameter "G" that is slightly larger than diameter "F" of the pin 20 (i.e., 0.0003"). In addition, a relieved portion 48, having a width generally designated as "H", is preferably machined along each side of the bore 46 as most particularly shown in FIGS. 9 and 10.

The total amount of clearance between the pin 20 and the slot 42 along Axis T—T (see FIG. 9) can be determined by the equations described below. It will be appreciated that the total amount of clearance between the pin 20 and the slot 42 along Axis T—T will equal twice the distance generally indicated as "K" in FIG. 9. The distance "K" can be calculated by first determining the distances designated as "L" and "M" on FIG. 9 and then subtracting the distance "M" from the distance "L".

Distance "L" is determined by creating a right triangle comprised of lengths "I" "L" and "N" wherein: the length "I" equals one half of the diameter "G" of the bore 46 and length "N" equals one half of the width "H" of the relieved portions 48 After determining lengths "I" "L" and "N" distance "L" may determined by solving the following mathematical equation:

$$L^2 = I^2 - N^2$$

Similarly, distance "M" may be determined by forming a right triangle comprised of lengths "J" "M" and "N" wherein: the length "J" equals one half of the diameter "F" of pin 20 and the length "N" as described above equals one half of the width "H" of the relieved portions 48. After determining lengths "J" and "N" distance "M" may be determined by solving the following mathematical equation:

$$M^2 = J^2 - N^2$$

After determining lengths "L" and "M" distance "K" may be easily determined by subtracting distance "M" from distance "L". As discussed above, the total amount of clearance between the pin 20 and the slot 42 along Axis T—T equals twice the distance "K" (i.e., "2("K")").

To illustrate the above-described calculations, the amount of clearance along axis T-T between a pin 20 having a diameter of 0.5000" (diameter "F") and a slot 42 formed from a bore 46 having a diameter of 0.5003" (diameter "G") with 0.497" wide relieved portions 48 (length "H") machined therein will be calculated below.

1. Distance "I"
  "I" = ½("G") = ½(0.5003") = 0.25015"
2. Distance "N"
  "N" = ½("H") = ½(0.497") = 0.2485"
3. Distance "L"
  ("L")² = ("I")² − ("N")²
  ("L")² = (0.25015")² − (0.2485")²
  "L" = 0.0287"
4. Distance "J"
  "J" = ½("F") = ½(0.5000") = 0.2500"
5. Distance "M"
  ("M") = ("J") − ("N")²
  ("M")² = (0.2500")² − (0.2485")²
  "M" = 0.0273"
6. Distance "K"
  "K" = "L" − "M" = 0.0287" − 0.0273"
  "K" = 0.0014"

As such, using the above-described calculations, the amount of clearance provided between pin 20 and slot 42 along axis T—T in the instant example equals 2("K") or 2(0.0014") or 0.0028".

As was previously discussed hereinabove, the present positioning method is well adapted for positioning and affixing a stationary clamping member onto the base member of a workholding apparatus. For example, as described below and illustrated in FIG. 11, the present positioning method may be used in connection with the workholding machine vise, generally designated as 50, that is adapted to securely restrain a first part 52 and a second part 54 during machining operations.

The basic structure of the workholding device 50 is similar to the workholding apparatus described in my U.S. Pat. No. 5,022,636, issued Jun. 11, 1991, entitled "Workholding Apparatus", the disclosure of which is herein incorporated by reference. As such, in the present Detailed Description of the Preferred Embodiments, the basic structure of the vise 50 will be described in general terms, it being understood that the particular details of the vise 50 construction, with the exception of those features which are described hereinbelow forming this embodiment of the present invention, may be gleaned from a review of that patent.

Figure 11:
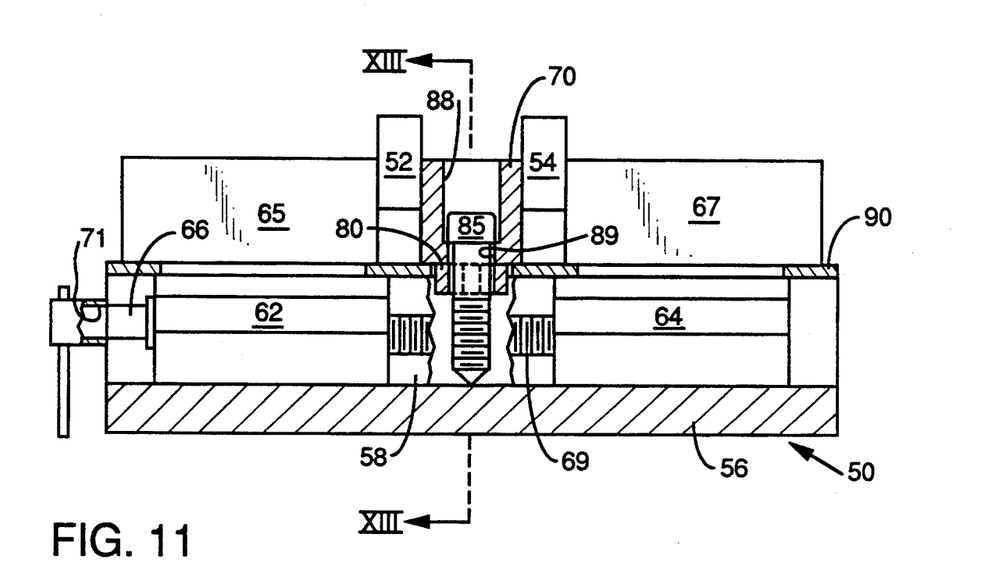
FIG. 11 is a side elevational view of a precision workholding device with certain elements shown in cross-section to illustrate the positioning and fastening method of the present invention.
Figure 12:
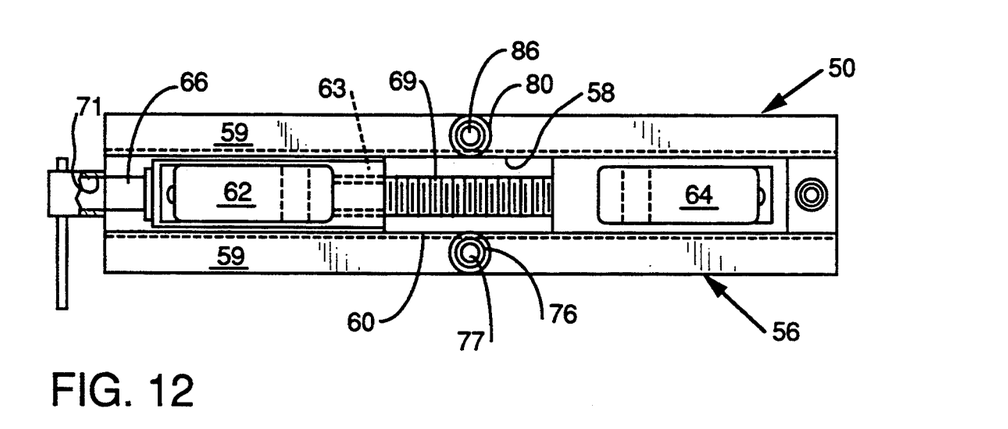
FIG. 12 is a plan view of the base assembly of the workholding device of FIG. 11.

The workholding vise 50 generally comprises a base member 56 which is an elongated metallic structure typically fabricated from a high strength aluminum material. As most particularly shown in FIG. 12, a slot 58 is machined along the longitudinal axis of the base member 56 and defines two longitudinally extending side rail members 59. In addition, a free-floating clamping assembly, generally designated as 60 is provided for movement within the slot 58 in the base member 56. The clamping assembly 60 includes a first slide member 62 and a second slide member 64 which are slidably received within the slot 58. As shown in FIG. 11, a workholding jaw portion 65 is preferably attached to the first slide member 62 and a second workholding jaw portion 67 is preferably attached to the second slide member 64. The workholding jaw portions 65 and 67 may be similar to those workholding jaw portions disclosed in U.S. Pat. No. 5,025,427 entitled "Quick Change Head For Precision Machine vise" the disclosure of which is incorporated herein by reference.

The clamping assembly 60 also includes a screw shaft 66 that is received within the slot 58 in the base member 56. One end of the screw shaft 66 is provided with threads 69 thereon which are intended to engage a threaded bore 63 within the first slide member 62. In addition, the screw shaft 66 includes means (not shown) for engaging and displacing the second slide member 64. The screw shaft 66 passes through the second slide member 64 while the other end of the screw shaft 66 preferably provides a receptacle 71 for receiving rotary motion which is input to the screw shaft 66.

A central fixed jaw member 70 is also attached to the base 56 between the movable slide members 62 and 64 such that the movable slide members 62 and 64 may move toward and away from the central fixed jaw member 70 to clamp workpieces 52 and 54 therebetween. For example, when the screw shaft 66 is rotated, the first movable slide member 62 is moved relative thereto, thereby causing the first workholding jaw portion 65 to move toward the central jaw member 70 to withhold a first part 52 therebetween. In addition, the rotation of the screw shaft 66 and its movement relative to the first movable slide member 62 causes the second movable slide member 64 to move toward the fixed central jaw member 70 to engage and restrain a second part 54. Because the central jaw member 70 must be accurately positioned and attached to the side rail members 59, I have found the positioning method of the present invention to be well adapted to accomplish that task while permitting the central fixed jaw member 70 to be easily removed from the base 56 should it become worn or damaged.

Figure 13:
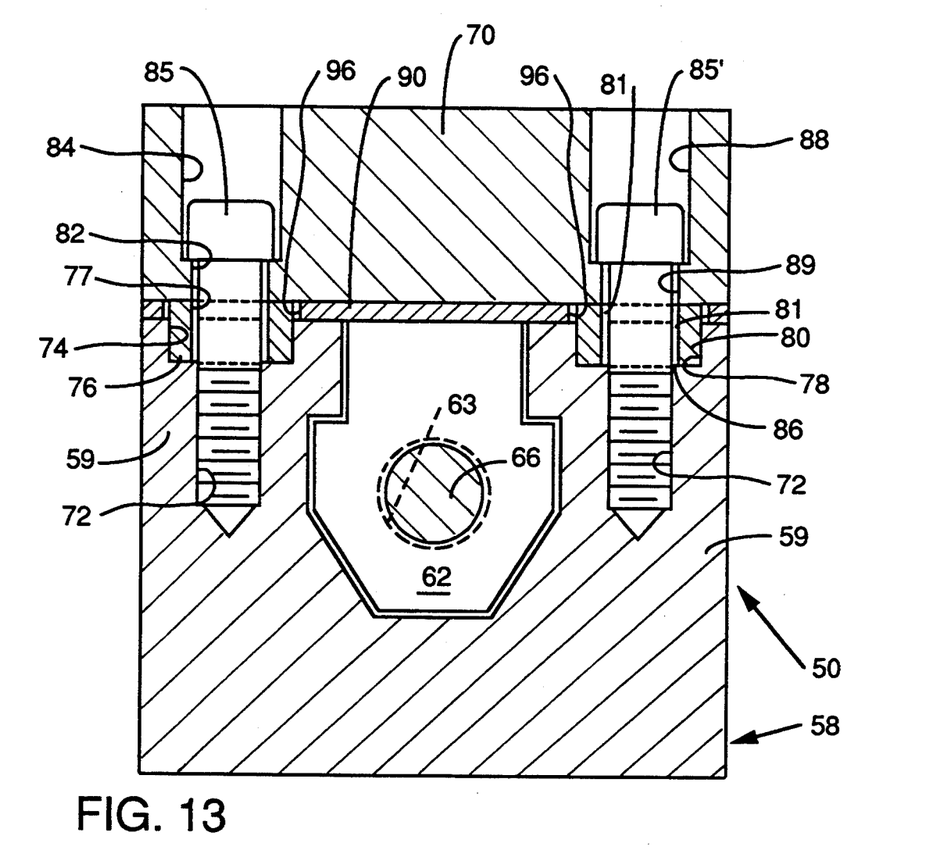
FIG. 13 is a cross sectional assembly view taken along line XIII—XIII of FIG. 11.

More specifically, as shown in FIGS. 11 and 13, a threaded bore 72 is provided in each side rail member 59. Coaxial with one threaded bore 72 is a bushing receiving counterbore 74 adapted to receive a bushing member 76 therein. The bushing member 76 is preferably fabricated from hardened steel and is preferably retained within the counterbore 74 by virtue of an interference fit created between the outer diameter of the bushing member 76 and the counterbore 74. However, those of ordinary skill in the art will appreciate that bushing member 76 may be fabricated from a variety of other suitable materials and may be attached to the side rail 59 by any suitable fastening means. Similarly, a second bushing member 80 is also received within a corresponding bushing receiving counterbore 78 provided in the other side rail 59 as most particularly shown in FIG. 13. It will be understood that bushing 80 is also preferably fabricated from hardened steel and is retained within the counterbore 78 by an interference fit created between the outer diameter of the bushing 80 and the inner diameter of the counterbore 78. However, as with bushing member 76, bushing member 80 may be fabricated from other suitable material and may be attached to the corresponding side rail member 59 by any suitable fastening means.

Bushing member 76 has a bore 77 therethrough that is coaxial with the threaded bore 72. As most particularly shown in FIG. 13, the central jaw member 70 is provided with a bore 82 therethrough that is coaxial with the bore 77 within the bushing 76 when the central jaw member 70 is accurately positioned on the side rails 59 of the base member 56. A counterbore 84, coaxial with bore 82, is also provided in the central jaw member 70 such that a shouldered cap screw 85 may be received therein as shown in FIG. 13. The bores 77 and 82 each preferably have an inner diameter that is slightly larger than the outer diameter of the cap screws 85 and 85" respectively (i.e., 0.0003"), so that the cap screws 85 and 85' may be inserted therein.

The bushing member 80 is provided with a slot 86 that has relieved side portions 81 therein. The attributes of bushing 80 and slot 86, in particular, may be gleaned from reviewing the portions of the present Detailed Description of the Preferred Embodiments wherein bushing member 40 was described. It will be appreciated, however, that slot 86 is adapted to receive therein a shouldered cap screw 85 that is inserted through a counterbore 88 and a bore 89 that are coaxial with the slot 86 and the corresponding threaded bore 72 provided in the side rail 59. As such, when assembled in the above-described manner, the central fixed jaw member 70 may be removably attached to the base member 56 of a precision workholding device 50 within a predetermined degree of accuracy using conventional machining techniques. The positioning of central jaw member 70 relative to base member 56 is thus controlled by the relative fit between bushings 76 and 80 on the shoulders of cap screws 85 and 85' respectively.

Figure 15:
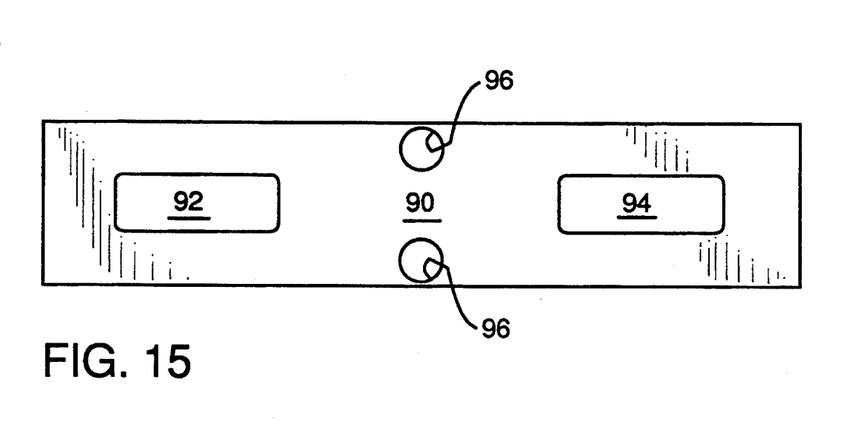
FIG. 15 is a plan view of workholding device according to the present invention.

During machining operations, foreign matter and debris created by the machining process often collect in slot 58 and may hamper the operation of the screw member 66. To eliminate the collection of such debris within the slot 58 and to provide protection to the side rails 59 of the base member 56 in the event that the workholding apparatus 50 is dropped, a plate member 90 is preferably provided. The plate member 90 is preferably fabricated from high strength stainless steel and has two longitudinal slots 92 and 94 provided therein (see FIG. 15). The skilled artisan will appreciate, however, that the plate member 90 may be fabricated from a myriad of other suitable materials adapted to protect the base member 56 of the workholding apparatus 50.

Figure 14:
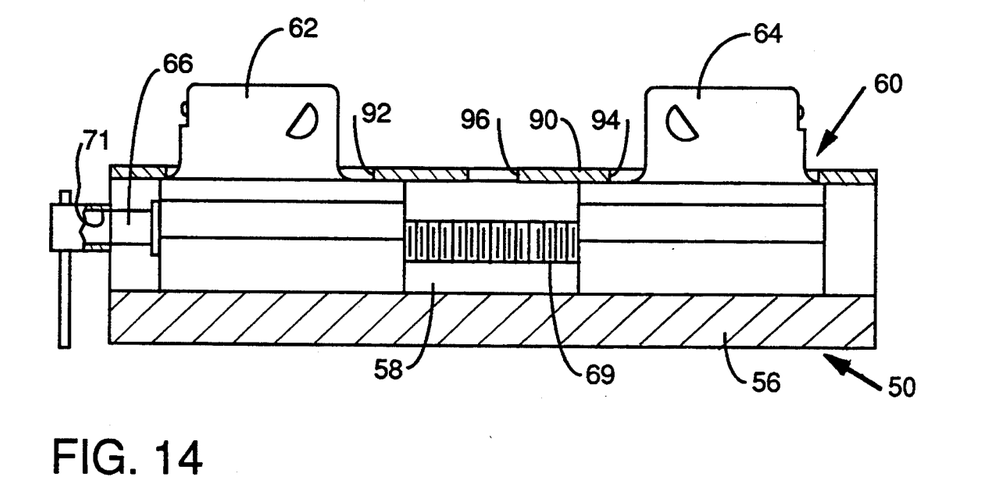
FIG. 14 is a side elevational view of a workholding device according to the present invention.
Figure 16:
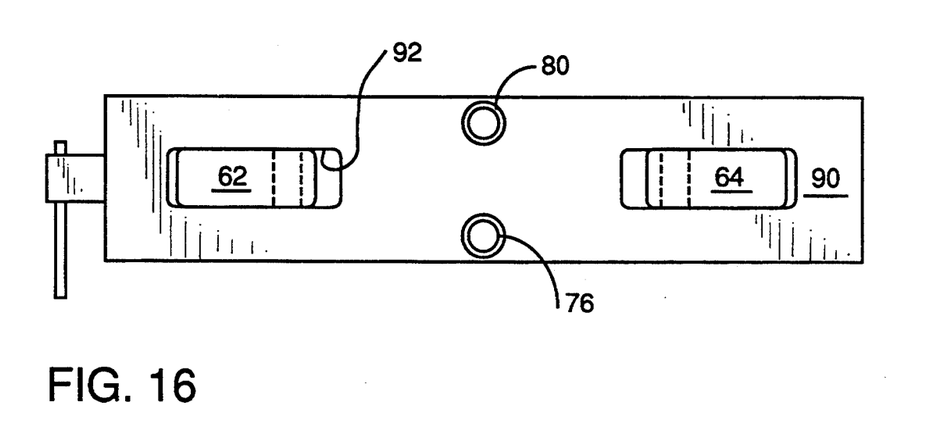
FIG. 16 is a plan assembly view of a workholding device according to the present invention.

As most particularly shown in FIGS. 14 and 16, the plate member 90 is received on the base 56 of the workholding device 50 such that the first movable slide member 62 is received in slot 92 and the second movable slide member is received in slot 94. In addition, plate member 90 has bores 96 therethrough that are adapted to receive a portion of bushings 76 and 80 therein as shown in FIG. 13. In the preferred embodiment, slots 92 and 94 are sized such that corresponding movable slide members 62 and 64 may freely slide therein. In addition, slots 92 and 94 are preferably sized to supply movable slide members 62 and 64 with a predetermined range of longitudinal motion. I also prefer to size the slots 92 and 94 such that they will always be covered by the jaw portions 65 and 67 regardless of the longitudinal position of the movable slide members 62 and 64 within the corresponding slots 92 and 94.

Accordingly, the present invention provides solutions to the aforementioned problems associated with precisely positioning a member on the planar surface of an object and, in particular, to the positioning problems commonly associated with workholding vises and similar apparatuses. The present invention provides a means for precisely positioning a member on the planar surface of an object using conventional machining techniques. The present invention further provides a means for limiting the longitudinal movement of the clamping members of a workholding vise while also affording protection from foreign objects to the vise's base and inner workings. It will be understood, however, that various changes in the details, materials and arrangements of parts which have been herein described and illustrated in order to explain the nature of the invention may be made by those skilled in the art within the principle and scope of the invention as expressed in the appended claims.

I claim:

1. In a machine vise having a base member with a longitudinal axis and a slot therein that extends along said longitudinal axis, a first jaw attached to said base member and a movable member received in and extending from said slot and supported on said base member for longitudinal movement along said slot toward and away from said first jaw, and a second jaw member attached to said movable member, the improvement comprising a plate member removably received on said base member between said second jaw member and said base member and having an opening for permitting the longitudinal movement of said movable member therein, said opening being completely covered by said second jaw member such that said second jaw member cooperates with said plate member to completely cover said slot to prevent debris from entering therein.

2. The improvement of claim 1 wherein said plate member is also disposed between said first jaw member and said base member.

3. The improvement of claim 1 wherein said plate has means for limiting the longitudinal movement of said movable member toward and away from said first jaw along said longitudinal axis to a predetermined range of travel.

4. The improvement of claim 3 wherein said means for limiting the movement of said movable member comprises said opening sized such that the longitudinal movement of said movable member toward and away from said first jaw member along said longitudinal axis is limited to said predetermined range of travel.

5. A debris shield for use in connection with a vise having a base member with a longitudinal axis and a slot therein that extends along the longitudinal axis, a first jaw attached to the base member and primary and secondary movable members received in and extending from said slot, the primary and secondary movable members each being supported on the base member for longitudinal movement along the slot toward and away from the first jaw, a primary jaw member attached to the primary movable member and a secondary jaw member attached to the secondary movable member, the debris shield comprising a plate member removably receivable on the base member between the primary and secondary jaw members and the base member, said plate member having a first opening therein for permitting the longitudinal movement of the primary movable member therein, said first opening being completely coverable by said primary jaw member and a second opening for permitting the longitudinal movement of the secondary movable member therein, said second opening being completely coverable by said secondary jaw member such that when said plate member is received on said base, the primary and secondary jaw members cooperate with said plate member to completely cover the slot to prevent debris from entering therein.

6. The debris shield of claim 5 wherein said plate member has primary travel limiting means for limiting the longitudinal movement of the primary movable member toward and away from the first jaw along the longitudinal axis to a primary predetermined range of travel when said plate member is received on said base member and secondary travel limiting means for limiting the longitudinal movement of the secondary movable member toward and away from the first jaw along the longitudinal axis to a secondary predetermined range of travel when said plate member is 7. The debris shield of claim 6 wherein said primary travel limiting means comprises said first opening sized such that the longitudinal movement of the primary movable member toward and away from the first jaw member along the longitudinal axis is limited to said primary predetermined range of travel when said plate member is received on said base member and wherein said secondary travel limiting means comprises said secondary opening sized such than the longitudinal movement of the secondary movable member toward and away form the first jaw member along said longitudinal axis ie limited to said secondary predetermined range of travel When said plate member is received on said base member.

* * * * *

UNITED STATES PATENT AND TRADEMARK OFFICE
CERTIFICATE OF CORRECTION

PATENT NO. : 5,442,844
DATED : August 22, 1995
INVENTOR(S) : George R. Swann

It is certified that error appears in the above-indentified patent and that said Letters Patent is hereby corrected as shown below:

Col. 6, line 15, delte ("M") = ("J") - ("N")$^2$ and substitute therefor -- ("M")$^2$ = ("J")$^2$ - ("N")$^2$.

Col. 9, line 23, delete "1" and substitute therefor -- 2 --.

Col. 10, line 28, after "is" add -- received on said base member -- .

Signed and Sealed this

Fifth Day of August, 1997

Attest:

BRUCE LEHMAN

Attesting Officer

Commissioner of Patents and Trademarks